Patented Oct. 2, 1945

2,386,163

UNITED STATES PATENT OFFICE 2,386,163

BUILDING BLOCKS

August Holmes, Cranford, N. J., and Joseph C. Roediger, Brooklyn, N. Y., assignors, by mesne assignments, to Standard Catalytic Company, a corporation of Delaware No Drawing. Application November 7, 1939, Serial No. 303,316

4 Claims. (Cl. 106—269)

This invention relates to improvements in the methods of treating soils for the manufacture of blocks for use in curtain or bearing wall construction, or as flooring blocks. These improvements may also be applied to the monolithic laying of soil-asphalt mixtures for low cost roadways, now termed "soil stabilization."

It is well known that dwellings may be made of earth or clay earth which is perhaps the material used in the first buildings erected by man, but the objections to structures of such material were that they often washed away during long, rainy seasons, were susceptible to infestation by rodents, vermin, and the like, and in many cases developed cracks due to stresses set up by climatic changes. Bricks were later used which were prepared by mixing clay and straw and allowing the moulded mixture to harden by exposure to the sun. In the development of brick manufacturing methods, artificial heat was used in order to obtain a stronger material which would resist the effects of water and thereby be an improvement over the ordinary clay-straw brick.

Building blocks have been manufactured in recent years from a mixture of soil, selected or adjusted to have a satisfactory grading and a suitable content of clay, with the proper amount of cutback asphalt or emulsified asphalt. This mixture which generally contains water to facilitate the thorough incorporation of the asphaltic material is compacted into blocks of the desired size using known methods of compaction. The finished block is then cured by natural or artificial means so that it may obtain a suitable strength before use in construction.

It is an object of this invention to manufacture building blocks using as the major proportion of the material clay or soil which is available close to the location where they are to be manufactured and thereby economizing by using the cheapest material available in that locality.

According to this invention, soil is mixed with a limited amount of an aqueous solution of an alkaline material, such as water-soluble soaps, alkaline hydroxides, or carbonates, trisodium phosphate, sodium silicate, etc. to prepare a plastic mixture of the soil. Lime may be added to the plastic mixture.

An asphalt binder containing a reactive agent such as oleic acid, naphthenic acid, etc. is then added to the plastic mixture. The asphaltic binder may be a combination of a flux oil and powdered hard asphalt having a softening point of 150° to 450° F., the latter added separately; an asphalt having a softening point ranging from 90° to 150° F.; a cutback asphalt, or an asphaltic emulsion. The mixture is then poured into moulds and cured. It may be subjected to pressures up to 3000 pounds per square inch, if desired. If the blocks prepared according to this method are to be exposed to moisture in sections of the country where the rainfall is substantially high, heat may be used to accelerate the curing of the block.

Likewise, the clay or soil may be first impregnated with about 1% to 10% of a water solution of a metallic salt, such as lead nitrate, iron chloride, iron sulfate, etc. The amount of salt in solution is preferably about 10%, although 2% to 25% solutions may be used. The soil, after thorough mixing, is treated with 2% to 20% of a cutback asphalt, preferably about 5% by weight. The cutback asphalt contains from 40 to 90% of an asphalt having a softening point ranging from 90° F. to as high as 150° F. The cutback or the asphalt solution contains agents such as fatty acids, metallic soaps, heptadecylamine, etc. The treated soil mixed with the cutback asphalt is then poured into moulds and subjected to pressure or tamping. The pressure used may be up to 3000 or more pounds per square inch, or a pneumatic tamping device may be used.

The building blocks on removal from the moulds are generally cured with or without the aid of artificial heat, to remove volatile materials. This is necessary in order that a reasonable strength may be developed before construction with the block is attempted. This applies to a lesser extent when the mixture is used for road construction. The curing operation, without the use of artificial heat, may be aided by the incorporation of a material such as cement, burnt lime, plaster of Paris, etc. which will take up the water and form hydrated compounds which develop additional strength in the mixture over that obtainable by the simple evaporation of water from the mixture. The finished block will have a high earlier strength if treated with a hydrating material.

For example, soil is treated with a suitable amount of water in order that the soil may have that water content permitting satisfactory subsequent incorporation of the asphaltic binder. To this moistened soil is then added the asphalt binder which may consist of flux oil and hard asphalt, cutback asphalt or emulsified asphalt, together with a wetting agent. About 3 to 10% of the asphalt binder is used. The soil and the asphalt binding material are thoroughly mixed, after which is added a suitable amount, usually in the range of 1 to 5%, of dry cement, burnt lime, gypsum, or other hydrating setting material to combine with the major portion of the water present in the soil. It is preferable in certain cases to add the hydrating setting material to the moistened soil before the addition of the asphalt binding material. The resulting mixture is then placed into moulds and subjected to a pressure of at least 50 pounds per square inch.

We claim:

1. A process of manufacturing building blocks, curtain wall blocks, floor blocks, etc., which comprises mixing in a cold state, soil and water containing an inorganic metallic salt to form a plastic mass, adding an asphalt containing a fatty acid to the plastic mass and submitting the mixture to pressure of at least 50 pounds per square inch.

2. A process of manufacturing building blocks, curtain wall blocks, floor blocks, etc., which comprises mixing a soil with an aqueous solution of lead nitrate to form a plastic mass, incorporating in the plastic mass a cutback asphalt containing heptadecylamine, pouring the mixture into moulds and subjecting the mixture to a pressure up to 3000 pounds per square inch.

3. A process of manufacturing building blocks, curtain wall blocks, and floor blocks which comprises, mixing in a cold state soil and water containing a metallic salt of the class consisting of lead nitrate, iron chloride and iron sulphate to form a plastic mass, adding an asphalt containing oleic acid to the plastic mass and subjecting the mixture to pressure of at least 50 pounds per square inch.

4. A process of manufacturing building blocks, curtain wall blocks and floor blocks which comprises mixing in a cold state soil and a fluid vehicle containing trisodium phosphate to form a plastic mass, adding an asphaltic bonding agent to which had been added oleic acid to the plastic mass, and molding the mixture into blocks.

JOSEPH C. ROEDIGER.
AUGUST HOLMES.